United States Patent
Girola

[15] 3,677,136
[45] July 18, 1972

[54] MASTER FOR MACHINE TOOLS, PARTICULARLY FOR MILLING MACHINES, TO REMOVE METAL BY LEVEL LAYERS

[72] Inventor: Angelo Girola, Via Alba 18, Busto Arsizio, Italy

[22] Filed: Dec. 29, 1969

[21] Appl. No.: 888,364

[52] U.S. Cl. .................................................90/62, 90/13 R
[51] Int. Cl. ..........................................................B23q 35/04
[58] Field of Search ....................82/14 A, 14 R; 90/13, 13.5, 90/13.8, 62

[56] References Cited

UNITED STATES PATENTS 3,357,309  12/1967  Rosebrook..................................90/62
3,132,552  5/1964   Andre......................................82/14 A
2,511,956  6/1950   Wetzel........................................90/62
2,913,945  11/1959  Granberg et al. ........................82/14 A
1,998,939  4/1935   Mittag........................................90/62
2,896,490  7/1959   Von Zelewsky........................82/14 A Primary Examiner—Gerald A. Dost
Attorney—Woodhams, Blanchard & Flynn

[57] ABSTRACT

The tracer point of the master is operatively connected with adjustable stops, which in accordance with the profile to be performed interfere to displace the workpiece in a constant direction and independently from the profile to be reproduced presented by the template.

10 Claims, 4 Drawing Figures

INVENTOR
ANGELO GIROLA

MASTER FOR MACHINE TOOLS, PARTICULARLY FOR MILLING MACHINES, TO REMOVE METAL BY LEVEL LAYERS

The present invention relates to a hydraulic master, for machine tools in general, and in particular for milling machines, to remove metal by level layers.

With particular, though not exclusive, reference to copying milling machines—to which the present invention is particularly, but not exclusively applicable—the workpiece is shaped or profiled as desired by removing parallel metal layers or layers having a constant thickness. This operating system shows several drawbacks, among which the need to trace at each stroke all of the profile of the template with a consequent considerable increase in working times since the tool has to follow the whole of the contour or profile of the workpiece.

An attempt was made to eliminate the above-mentioned drawback by removing from the workpiece being machined either parallel or constant level metal layers. However, the drawback was not overcome since the template must be traced completely and tool passes idle over the already processed surface.

The object of the present invention is to provide a master of the above-mentioned type, capable of performing the desired shaping operations within a considerably shorter working time and thus preventing a quick wear of the tool.

The present invention aims particularly at removing from the workpiece being machined metal layers having practically a constant thickness preventing the tool from performing needless displacements and thus considerably reducing the machine dead times.

A further object of the present invention is to attain the above-mentioned results also in the case in which copying valves of the biaxial type are used, i.e., valves which control not only the feed motion of the workpiece with respect to the tool but also the feed motion itself.

The master according to the present invention, which can be advantageously applied to milling machines in which the copying valve provides for the displacement of the tool with respect to the workpiece being machined and the template, which later is combined with a plurality of adjustable stops, is characterized by means to operatively connect the tracer point cooperating with the template with the tracer point cooperating with the adjustable stops so that either one or the other of said tracer point acts upon the movable equipment of the copying valve to control the tool in such a way as to remove from the workpiece metal layers having substantially level thickness thanks to the presence of the adjustable stops; or metal layers showing a mixed linear extension with relation to the profile of the template.

In practice, the above-mentioned inventive idea can be embodied in several forms, according to the desired various characteristics of use, for instance, the operative connection of two tracer points may be effected by means of leverages showing the desired ration and/or by means of wholly mechanical or fluid pressure transmissions or of other transmissions of known type.

The kinematic transmission between the two tracer points may provide for flexible lengths thus facilitating the operative connection between the tracer points only.

To the end of limiting the copying displacements at the surface of the workpiece being machined by the tool in accordance with the profile of the template, the present invention provides that the movable equipment of the tracer point for the adjustable stops be associated with members sensible to the axial displacement of said tracer point, such means being provided with operative connections such as to actuate the members designed to reverse the feed motion of the workpiece, to the purpose of tracing copying lines, the extension or length of which is limited with respect to the overall length of the template.

It is thus possible to rough-mill the workpiece being machined by removing each time from said workpiece surfaces of variable length in accordance with the profile to be reproduced. At the end of the rough-mill operation stepped surfaces are thus obtained, which, successively, may easily be definitely shapped through one or two operative cycles only.

The invention will now be explained in the following specification which refers to the attached drawings, which are given only by way of example and show a preferred embodiment of the master according to the present invention applied to a die milling machine.

Figure 1:
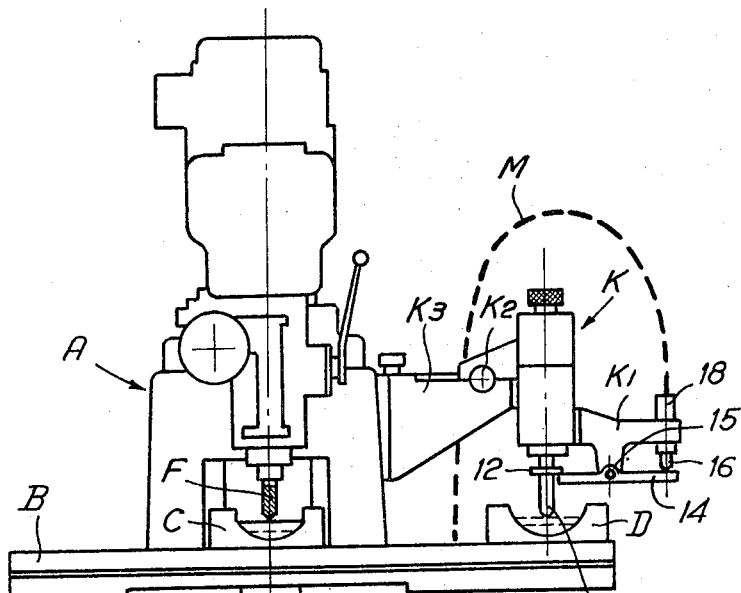
FIG. 1 is a schematic elevational view of the front side of a milling machine of the type equipped with a movable table and with a hydraulic master according to the present invention.

With reference to FIG. 1, the milling machine A is provided with a movable table B supporting workpiece C and template D reproducing the profile to be transferred onto said workpiece C.

The tool F is being retained in well-known manner by the spindle of the milling machine and advantageously operated.

The movable table B is retained by carriage $B_1$ supported by bracket $B_2$ slidable along vertical guides provided by frame A of the milling machine. Bracket $B_2$ of the worktable is connected with the movable part of a cylinder-piston unit H secured to frame A of the milling machine, and the chambers of said unit being connected in a well known manner either with an outlet or with a pressure generator thus imparting to workpiece C the necessary feed motion. Said unit H is controlled by a copying valve K, which is retained by means of three slides $K_1$, $K_2$, and $K_3$ having orthogonal axes to frame A. Copying valve K may be of any of the known types, also of the biaxial type. Bracket B2 supports movable table B laterally retains bracket B3 for stop-carrier drum L.

According to the present invention, tracer point 10 of copy valve K is provided with a collar 12, arranged in an advantageous position, which engages one of the ends of a lever 14, which pivot point 15 is retained by bracket $K_4$. The other end of said lever 14 engages a slider 16 retains by a guiding tube 18 secured to valve K by means of the bracket $K_4$.

Slider 16 connects with its free end and by means of transmission M of any desired type to a second slider 20 guided in a tube 22 secured by means of arm 24 to frame A of the milling machine.

Advantageously, transmission M is of the flexible type but it can be as well of the mechanical type (Bowden cable, Teleflex cable, Flex Ball cable and the like) or submitted to fluid pressure, for instance to oil pressure. In this latter case sliders 16 and 20 are connected with the movable equipments of two cylinder-piston units: one being a transmitting and the other a receiving unit. Obviously, transmission M could be replaced by other known systems, to interlock in this way the two above-mentioned sliders 16 and 20.

Slider 20 constitutes a second tracer point cooperating with adjustable stops 26 during operation of the milling machine. Drum L which is being rotated step by step, is rotatably retained by a support 27 secured to bracket B3 and angularly positioned by means of a spring latch 28, said latch being disengaged from tube 30, secured in an advantageous position, to frame A. When bracket B2 is lowered to a preselected position, stop-carrier drum L is rotated by one step to located one of stops 26 in front of the second tracer point 20. The second tracer point 20 has an advantageously positioned inclined surface 32 (see FIG. 2) forming an axial cam, cooperating with the movable springed equipment of an electric switch 34, such as for instance a microswitch, to control the feed of an electric valve (not shown) plugged in the feeding circuit comprised by cylinder-piston unit H.

Another microswitch 36 is fixed to bracket B3, said microswitch being operated by a projector or by a cam shown in an advantageous, angular position, by the movable part of stop-carrier drum L. Microswitch 36 controls the feeding circuit of the master, in such a way as to bring said master to a standstill, when stop-carrier drum L assumes a pre-established angular position, which corresponds to the end of the above-described operating cycle.

Figure 3:
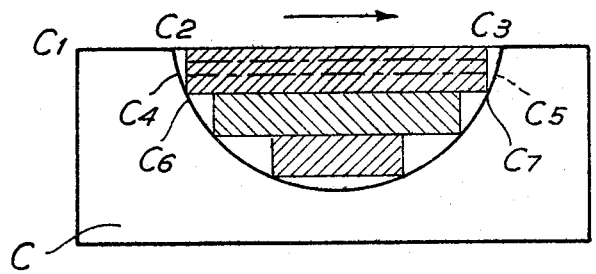
FIG. 3 shows the section of a die, the cavity of which is shaped by the master according to the present invention.

The operating of the master will now be described with reference to FIG. 3 in relation to rough-milling and finishing operation imparted to die C.

After having placed the workpiece C and template D on worktable B, the position of tracer points 10 and 20 with respect to the workpiece and template surfaces is set by means of slides $K_1$, $K_2$, and $K_3$. Then the first operating cycle is started, during which tool F cooperates with the upper face of the die, along the path $C_1$–$C_2$. At the end of said path tool F is being ulteriorly approached to die C in order to remove the metal layer indicated by dash-and-dot line $C_2$–$C_3$. When the tracer point 10, on its way along line $C_1$–$C_2$–$C_3$, meets with the profile presented by template D at a point corresponding to $C_2$, said tracer point 10 moves downward, causing in this manner the upward motion of bracket $B_2$ until the first of the stops 26 cooperates with the second tracer point 20. In this case slider 16 operates, by means of transmission M, lever 14, which, through collar 12, displaces the movable equipment of copying valve K in such a way as to stop the upward motion of bracket $B_2$ and hence the motion of workpiece C toward tool F.

At a consequence, when tracer point 10 reaches a cavity or a recess of template D, said tracer point is stopped at a pre-established height, in such a way that tool F practically does not move from its initial position. The feed motion of worktable B causes the removal of metal layer $C_2$–$C_3$. Operations continue till the end of the cycle, i.e., tool F moves along a line until it reaches $C_3$. The next line traced by tool F is confined in width in accordance with $C_2$–$C_3$ shown by the template. In other words, when tracer point 10 is in a position corresponding to the cavity of the profile of template D and contacts the end wall of the template corresponding to position $C_3$, said tracer point 10 is shifted upwardly by said wall, by a very small length, thus causing bracket $B_2$ to move downward and, as a consequence, the disengagement of tracer point 20 from stop 26. It follows that tracer point 20 moves out of tube 22 controlling, through cam 32, microswitch 34, thus reversing the feed motion of table B.

The same operation is repeated when tracer point 10 contacts the opposite wall of the cavity of the template (corresponding to position $C_2$, FIG. 3) in such a way that the copying cycle continues over lengths having reduced widths, in accordance with the widths of the template's cavity.

Therefore, at the end of the above-described working cycle, latch 28, engaging cam 30, causes the displacement, by one step, of stop-carrier drum, in order to dispose, in front of the second tracer point 20, another stop 26, less high than the preceding stop. Thus, a further working cycle is started, which continues as previously described, in order to remove, from the workpiece, layers $C_4$–$C_5$–$C_6$–$C_7$ and so on, to obtain a profiled cavity with step-like outline.

Upon conclusion of the rough die milling operation, stop-carrier drum L is brought to a standstill and an exclusive and complete copying cycle is performed, during which a whole cooperation of tracer point 10 with the profile of the template D takes place in order to reproduce on the workpiece the profile of the template's imprint. As that drum L at the end of the above-mentioned finishing cycle is again displaced by one step microswitch 36 is actuated to interrupt the master's operation in such a way that the operator can start the working of another piece.

Figure 2:
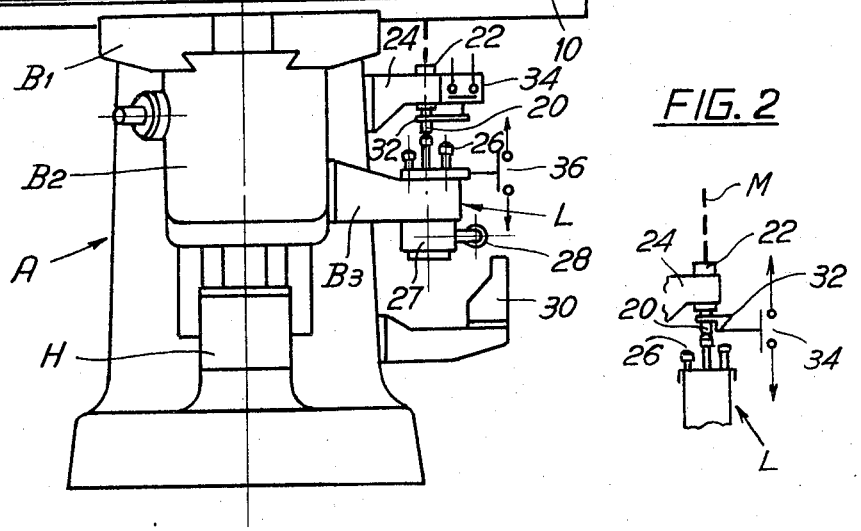
FIG. 2 is a detail of FIG. 1 on enlarged scale.
Figure 4:
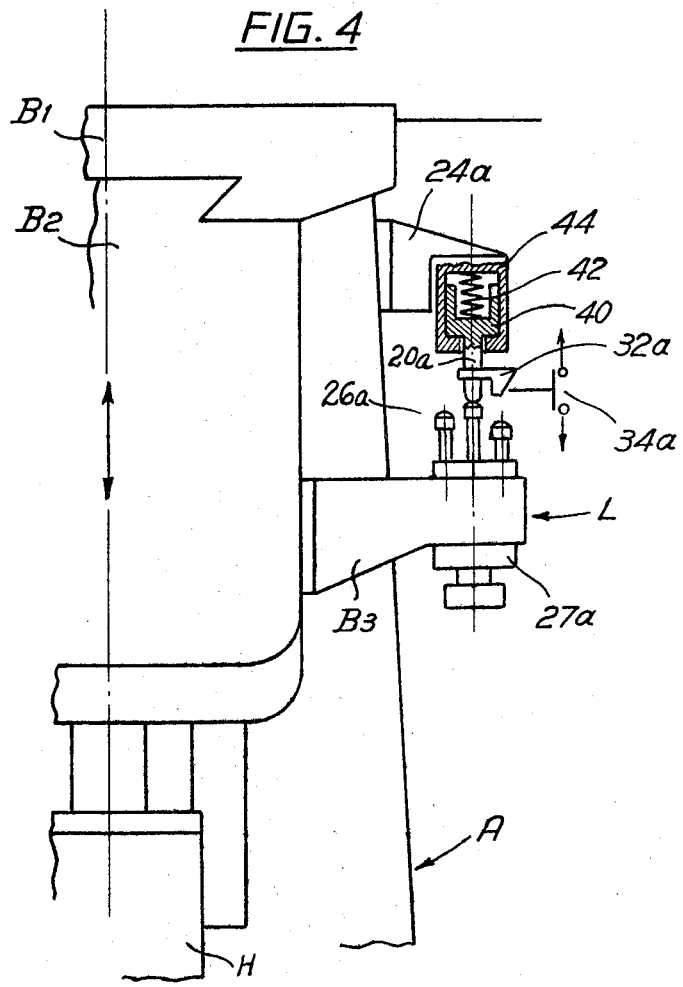
FIG. 4 is a schematic and partial view of a simplified embodiment of the master according to FIG. 1.

Now, considering the alternate embodiment of the present invention, shown in FIG. 4, wherein the pieces like those shown in FIGS. 1 and 2 are marked with identical reference numerals, the removal from workpiece C of the parallel layers is carried out by means of a simplified structure, wherein stop-carrier drum L is provided with adjustable stops 26a, of the force type, i.e., such as to resist and react to the force to which said stops are submitted by cylinder-piston unit H and bracket $B_2$. In this case the copying valve is of the conventional type, that is such as to control only the feed motion of workpiece C with respect to tool F.

Slider 20a, cooperating with the adjustable stops 26a, is integral with bottom plate 40 retaining one of the ends of a helical spring 42, the opposite end of said spring being retained by the bottom of a small cap 44 secured to frame A of the milling machine by means of arm 24a. As previously explained, slider 20a controls switch 34a to energize the electric valve designed to control the motion of worktable B.

In the case of the present modification, the master works in the same way as that described with reference to FIG. 1, i.e., the vertical motion of bracket $B_2$ is controlled, each time, by stops 26a retaining said bracket and hence worktable B, in such a position as to control the removal, from workpiece C, of parallel layers $C_2$–$C_3$, $C_4$–$C_5$ etc. (see FIG. 3).

It is of course possible to modify the master according to the features of the machine tool to be used. For instance, in the case of milling machines with movable head, copying valve K, sliders 16 and 32 with the corresponding supports, are retained by the movable head of the milling machine, whereas stop-carrier drum L is retained by frame A of the machine.

It is to be understood that this protection extends, as well, to the machine tool incorporating the master, or equipped with the master of the present invention.

However, the details of the embodiment of the master may undergo modifications and changes without overcoming the domain of this invention and hence the domain of the patent.

The embodiments of the invention in which an exclusive property or privilege is claimed are defined as follows:

1. In a machine tool having a frame, tool means mounted on the frame and disposed for removing material from a workpiece, workpiece holder means mounted on the frame and adapted to have a workpiece mounted thereon, mounting means movably mounting one of said tool means and said holder means relative to said frame for permitting relative reciprocal movement between said holder means and said tool means in a first direction to permit said tool means to linearly traverse said workpiece for removing a layer of material therefrom, and feed means for linearly and intermittently advancing one of said tool means and said holder means relative to the other thereof in a second direction substantially transverse to said first direction for permitting said tool means to successively remove layers of substantially constant thickness from said workpiece in response to relative movement between said workpiece and said tool means in said first direction, the improvement comprising:

template means mounted on said machine tool and having contour means thereon substantially corresponding to the desired contour which is to be machined on said workpiece;

follower means mounted for linear movement relative to said template means in a direction substantially parallel to said first direction in response to relative movement between said tool means and said holder means in said first direction, said follower means being adapted to contact said contour means for determining the end positions of the relative movement between said tool means and said holder means in said first direction, said follower means being movable in a third direction substantially transverse to said first direction in response to engagement of said follower means with said contour means; and control means coacting between said follower means and said feed means for intermittently energizing said feed means to cause said one of said tool means and said holder means to be intermittently moved relative to the other thereof in said second direction for permitting said tool means to successively remove substantially constant thickness layers of material from said workpiece in response to reciprocation of said tool means relative to said workpiece in said first direction;

said control means including valve means for controlling movement of said holder means relative to said tool means in at least one of said first and second directions;

said control means further including stop means mounted on said frame and having a plurality of adjustable stop members, slide means slidably mounted relative to said frame and disposed for coaction with a selected one of said stop members for limiting linear displacement of said slide means, and movable linkage means operatively interconnected between said slide means and said follower means for causing a proportional and corresponding displacement of said slide means in response to a displacement of said follower means in said third direction due to said follower means contacting said contour means; and said linkage means also being operatively interconnected between said follower means and said valve means for controlling the position of said valve means in response to displacement of said follower means by contact thereof with said contour means, said linkage means including a slider member coacting with the valve means, a lever fulcrumed on the valve means and coacting between the follower means and the slider member, and a kinematic chain operatively connected between the slider member and the slider means.

2. A machine tool according to claim 1, wherein the kinematic chain is a mechanical chain.

3. A machine tool according to claim 1, wherein the kinematic chain includes a transmission of the fluid-operated type.

4. A machine tool according to claim 1, wherein the kinematic chain includes a flexible but axially stiff member.

5. A machine tool according to claim 1, wherein said stop means includes a rotatable drum having said plurality of adjustable stop members mounted thereon, said stop members projecting axially different distances from one end of said drum, said drum being mounted for movement in said second direction in response to relative movement in said second direction between said tool means and said holder means, and actuating means coacting between said drum and said frame for causing angular displacement of said drum in response to axial displacement of said drum for causing a different stop member to be movably displaced into a position disposed in alignment with said slide means.

6. In a machine tool having a frame, tool means mounted on the frame and disposed for removing material from a workpiece, workpiece holder means mounted on the frame and adapted to have a workpiece mounted thereon, mounting means movably mounting one of said tool means and said holder means relative to said frame for permitting relative reciprocal movement between said holder means and said tool means in a first direction to permit said tool means to linearly traverse said workpiece for removing a layer of material therefrom, and feed means for linearly and intermittently advancing one of said tool means and said holder means relative to the other thereof in a second direction substantially transverse to said first direction for permitting said tool means to successively remove layers of substantially constant thickness from said workpiece in response to relative movement between said workpiece and said tool means in said first direction, the improvement comprising:

template means mounted on said machine tool and having contour means thereon substantially corresponding to the desired contour which is to be machined on said workpiece;

follower means mounted for linear movement relative to said template means in a direction substantially parallel to said first direction in response to relative movement between said tool means and said holder means in said first direction, said follower means being adapted to contact said contour means for determining the end positions of the relative movement between said tool means and said holder means in said first direction, said follower means being movable in a third direction substantially transverse to said first direction in response to engagement of said follower means with said contour means; and control means coacting between said follower means and said feed means for intermittently energizing said feed means to cause said one of said tool means and said holder means to be intermittently moved relative to the other thereof in said second direction for permitting said tool means to successively remove substantially constant thickness layers of material from said workpiece in response to reciprocation of said tool means relative to said workpiece in said first direction;

said control means including valve means for controlling movement of said holder means relative to said tool means in at least one of said first and second direction;

said control means further including stop means mounted on said frame and having a plurality of adjustable stop members, slide means slidably mounted relative to said frame and disposed for coaction with a selected one of said stop members for limiting linear displacement of said slide means, and movable linkage means operatively interconnected between said slide means and said follower means for causing a proportional and corresponding displacement of said slide means in response to a displacement of said follower means in said third direction due to said follower means contacting said contour means;

said linkage means also including means interconnected between said follower means and said valve means for controlling the position of said valve means in response to displacement of said follower means by contact thereof with said contour means; and reversing means associated with said slide means and responsive to the movement thereof for causing the relative movement between said tool means and said holder means in said first direction to be reversed whenever said slide means is displaced due to displacement of said follower means in said third direction as caused by contact of said follower means with said contour means, whereby the relative feeding motion between said tool means and said holder means in said first direction occurs solely over a limited distance which is defined between opposed portions of said contour means, which limited distance is less than the overall width of the template means.

7. In a machine tool having a frame, tool means mounted on the frame and disposed for removing material from a workpiece, workpiece holder means mounted on the frame and adapted to have a workpiece mounted thereon, mounting means movably mounting one of said tool means and said holder means relative to said frame for permitting relative reciprocal movement between said holder means and said tool means in a first direction to permit said tool means to linearly traverse said workpiece for removing a layer of material therefrom, and feed means for linearly and intermittently advancing one of said tool means and said holder means relative to the other thereof in a second direction substantially transverse to said first direction for permitting said tool means to successfully remove layers of substantially constant thickness from said workpiece in response to relative movement between said workpiece and said tool means in said first direction, the improvement comprising:

template means mounted on said machine tool and having contour means thereon substantially corresponding to the desired contour which is to be machined on said workpiece;

follower means for linear movement relative to said template means in a direction substantially parallel to said first direction in response to relative movement between said tool means and said holder means in said first direction, said follower means being adapted to contact said contour means for determining the end positions of the relative movement between said tool means and said holder means in said first direction, said follower means being movable in a third direction substantially transverse to said first direction in response to engagement of said follower means with said contour means; and control means coacting between said follower means and said feed means for intermittently energizing said feed means to cause said one of said tool means and said holder means to be intermittently moved relative to the other thereof in said second direction for permitting said tool means to successively remove substantially constant thickness layers of material from said workpiece in response to reciprocation of said tool means relative to said workpiece in said first direction;

said control means including valve means for controlling movement of said holder means relative to said tool means in at least one of said first and second directions;

said control means further including stop means mounted on said frame and having a plurality of adjustable stop members, slide means slidably mounted relative to said frame and disposed for coaction with a selected one of said stop members for limiting linear displacement of said slide means, and movable linkage means operatively interconnected between said slide means and said follower means for causing a proportional and corresponding displacement of said slide means in response to a displacement of said follower means in said third direction due to said follower means contacting said contour means;

said linkage means also including means interconnected between said follower means and said valve means for controlling the position of said valve means in response to displacement of said follower means by contact thereof with said contour means;

said holder means comprising a work table mounted for linear reciprocation relative to said frame substantially along said first direction, said work table being adapted to have both said workpiece and said template means fixedly secured thereto;

said mounting means including a support member movably supported on said frame and slidable relative thereto substantially along said second direction, said support member having said work table slidably supported thereon;

said feed means including fluid pressure cylinder means coacting between said frame and said support member for causing linear movement thereof in said second direction, energization of said cylinder means being controlled by said valve means; and said stop means being mounted on said support member, and said slide means being slidably supported on said frame.

8. A machine tool according to claim 7, wherein said stop means includes a drum rotatably supported on a support bracket fixedly secured to support member, said drum being rotatable about an axis substantially parallel to said second direction, and said plurality of stop members being fixedly secured to said support drum and extending axially outwardly from one end of said drum through different distances, one of said stop members being substantially aligned with said slide means for controlling the displacement thereof, said drum being rotatable to selectively permit different stop members to be aligned with said slide means for controlling the relative displacement of said tool means relative to said holder means in said second direction.

9. A machine tool according to claim 8, further including actuating means coacting between said frame and said drum for causing said drum to be automatically rotatably displaced to position a different stop member in alignment with said slide means when said support member is disposed in a preselected position relative to said frame.

10. A machine tool according to claim 7, further including switching means for reversing the relative movement between said tool means and said holder means along said first direction when said follower means contacts and is axially displaced by said contour means for causing said tool means to relatively linearly reciprocate in correspondence with the linear reciprocation of said follower means between opposed portions of said contour means for causing removal from said workpiece of successive level layers of material.

* * * * *